(12) United States Patent
Nagy et al.

(10) Patent No.: US 6,689,848 B2
(45) Date of Patent: Feb. 10, 2004

(54) LATE TRANSITION METAL POLYMERIZATION CATALYSTS

(75) Inventors: Sandor Nagy, Naperville, IL (US); Karen L. Neal-Hawkins, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/090,269

(22) Filed: Mar. 4, 2002

(65) Prior Publication Data

US 2003/0166806 A1 Sep. 4, 2003

(51) Int. Cl.[7] ............................. C08F 4/44; B01J 31/00
(52) U.S. Cl. ...................... 526/129; 526/133; 526/134; 526/161; 526/172; 502/155; 502/167
(58) Field of Search ................. 526/171, 172, 526/129, 133, 134, 161; 502/155, 167

(56) References Cited

U.S. PATENT DOCUMENTS

| | | | |
|---|---|---|---|
| 3,651,065 A | 3/1972 | Yagi et al. ................. 260/270 |
| 5,153,157 A | 10/1992 | Hlatky et al. .............. 502/117 |
| 5,198,401 A | 3/1993 | Turner et al. .............. 502/155 |
| 5,241,025 A | 8/1993 | Hlatky et al. .............. 526/129 |
| 5,539,124 A | 7/1996 | Etherton et al. ........... 548/402 |
| 5,554,775 A | 9/1996 | Krishnamurti et al. ......... 556/7 |
| 5,714,556 A | 2/1998 | Johnson et al. ............ 526/135 |
| 5,866,663 A | 2/1999 | Brookhart et al. .......... 526/170 |
| 5,902,866 A | 5/1999 | Nagy et al. ................ 526/133 |
| 6,211,311 B1 | 4/2001 | Wang et al. ............... 526/131 |
| 6,531,424 B2 * | 3/2003 | Ittel et al. ................ 502/155 |

OTHER PUBLICATIONS

Puddephatt et al., Protonolysis Dimethylplatinum(II) Complexes: Primary Attack at Metal or Ligand, Organometallics 2000, 19 563–570.*
Gibson et al., *J. Am. Chem. Soc. 121*, (1999) 8728.
Brookhart et al., *J. Am. Chem. Soc. 120*, (1998) 4049.
Cloke et al., *J. Organomet. Chem. 506*, (1996) 343.
McConville et al., *Organometallics 15*, (1996) 5085.
McConville et al., *Organometallics 15*, (1996) 5586.
Hinman et al., *Organometallics 19*, (2000) 563, at 568.

* cited by examiner

*Primary Examiner*—Robert Harlan
(74) *Attorney, Agent, or Firm*—Kevin M. Carroll

(57) ABSTRACT

A single-site olefin polymerization catalyst is described. The catalyst comprises an activator and an inorganic compound comprising iron and a tridentate N-(2-ethylamino)-2-pyridylmethanimino or N,N-bis(2-pyridylmethyl)amino ligand. The late transition metal catalyst is active in olefin polymerization.

16 Claims, No Drawings

LATE TRANSITION METAL POLYMERIZATION CATALYSTS

FIELD OF THE INVENTION

This invention relates to a catalyst and its use in olefin polymerization. The catalyst comprises an activator and an inorganic compound that contains iron and a tridentate N-(2-ethylamino)-2-pyridylmethanimino or N,N-bis(2-pyridylmethyl)amino ligand.

BACKGROUND OF THE INVENTION

Interest in single-site (metallocene and non-metallocene) catalysts continues to grow rapidly in the polyolefin industry. These catalysts are more active than conventional Ziegler-Natta catalysts, and they produce polymers with improved physical properties. The improved properties include narrow molecular weight distribution, reduced low molecular weight extractables, enhanced incorporation of α-olefin comonomers, and lower polymer density.

While traditional metallocenes commonly include one or more cyclopentadienyl groups, many other ligands have been used. Putting substituents on the cyclopentadienyl ring, for example, changes the geometry and electronic character of the active site. Thus, a catalyst structure can be fine-tuned to give polymers with desirable properties. Other known single-site catalysts replace cyclopentadienyl groups with one or more heteroaromatic ring ligands such as boraaryl (see, e.g., U.S. Pat. No. 5,554,775), pyrrolyl, indolyl (U.S. Pat. No. 5,539,124), or azaborolinyl groups (U.S. Pat. No. 5,902,866).

Single-site catalysts based on late transition metals (i.e., those in Groups 8–10, such as Fe, Ni, Pd, and Co) and diimines or other ligands have recently sparked considerable research activity because of their unusual ability to incorporate functionalized comonomers or to give branched polyethylenes without including a comonomer. See, for example, U.S. Pat. Nos. 5,714,556 and 5,866,663. These catalysts are often less active than would otherwise be desirable.

Other late transition metal catalyst systems have also been disclosed. 2,6-bis(imino)pyridine complexes of iron and cobalt are disclosed in Gibson, et al., *J. Am. Chem. Soc.* 121 (1999) 8728 and in Brookhart, et al., *J. Am. Chem. Soc.* 120 (1998) 4049. These 2,6-bis(imino)pyridine complexes are shown to be active in ethylene polymerization. Chelating bis(amido) ligands have been described. See, for example, Cloke et al., *J. Organomet. Chem.* 506 (1996) 343, which discloses a ligand having secondary amine groups that chelate with a Group 4 transition metal. Similarly, Johnson et al. have described nickel-olefin pi-complexes in which two primary, secondary, or tertiary amine groups chelate the nickel atom (see, e.g., U.S. Pat. No. 5,714,556 at columns 4547). Tridentate complexes in which two secondary amine groups and a pyridinyl group bind to the transition metal are also known from McConville et al. (see, e.g., *Organometallics* 15 (1996) 5085, 5586). U.S. Pat. No. 3,651,065 describes a nickel catalyst that is active in the oligomerization of butadiene.

Improved single-site catalysts for olefin polymerization are still needed. Particularly valuable catalysts would be easy to synthesize and would have high activities.

SUMMARY OF THE INVENTION

The invention is a catalyst for polymerizing olefins. The catalyst comprises: (a) an activator; and (b) an inorganic compound comprising iron and a tridentate N-(2-ethylamino)-2-pyridylmethanimino or N,N-bis(2-pyridylmethyl)amino ligand. The tridentate ligand is easily prepared from inexpensive starting materials. The catalyst is useful in olefin polymerization.

DETAILED DESCRIPTION OF THE INVENTION

Catalysts of the invention comprise an activator and an inorganic compound comprising iron and a tridentate ligand.

The inorganic compound contains a tridentate ligand. The tridentate ligand is a substituted or unsubstituted N-(2-ethylamino)-2-pyridylmethanimino ligand or a substituted or unsubstituted N,N-bis(2-pyridylmethyl)amino ligand. Members of the N-(2-ethylamino)-2-pyridylmethanimino class of ligands have the basic chemical structure:

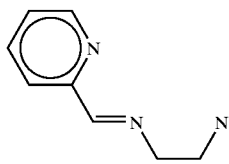

where any carbon and the primary nitrogen of the basic structure can be substituted or unsubstituted. Members of the of N,N-bis(2-pyridylmethyl)amino class of ligands have the basic chemical structure:

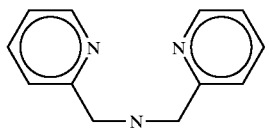

where any carbon and the secondary nitrogen of the basic structure can be substituted or unsubstituted.

Typical substituents on the carbon or nitrogen atoms of the basic structures include halogens, hydroxides, sulfoxides, $C_1$–$C_{20}$ alkoxys, $C_1$–$C_{20}$ siloxys, $C_1$–$C_{20}$ sulfoxys, $C_1$–$C_{20}$ hydrocarbyl, or a condensed ring attached to the pyridyl groups. These substituents replace the hydrogen atom of the unsubstituted structure.

Preferred tridentate ligands have the formula:

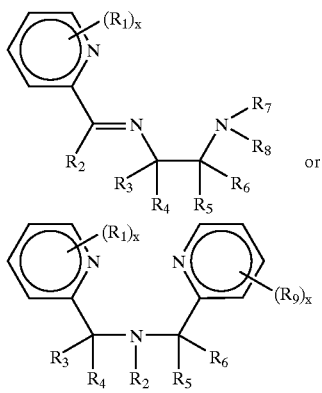

where
- $R_1$ and $R_9$, are the same or different, and are H, F, Cl, Br, I, $C_1$–$C_{20}$ hydrocarbyl, or a condensed ring;
- $R_2$, $R_3$, $R_4$, $R_5$, $R_6$, $R_7$, and $R_8$, are the same or different, and are H or $C_1$–$C_{20}$ hydrocarbyl; and
- x=0–5.

The tridentate ligands are well known and easily prepared from known methods. In one convenient method described in Hinman, et. al., *Organometallics*, 2000, 19, 563, at 568, a pyridinecarboxaldehyde is reacted directly with a diamine, such as N,N-diethylethylenediamine, in an inert organic solvent. Stoichiometric quantities are typically used. The reactions are typically performed at room temperature, but temperatures of −20° C. to 150° C. can also be used. The solvent is typically removed by evaporation and the tridentate ligand is collected.

In the inorganic compound of the invention, the tridentate ligand is coordinated to iron such that iron is bound to the three nitrogen atoms of the ligand. The iron may also have other ligands. Suitable additional ligands include halides, nitrates, sulfates, carboxylates (e.g. acetate), acetylacetonates, and amines. Particularly preferred ligands are halides, such as chloride, bromide, and iodide.

A preferred catalyst comprises an activator and an inorganic compound of the formula:

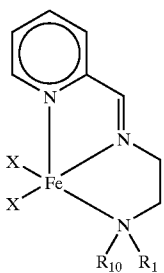

where $R_{10}$ and $R_{11}$ are the same or different, and are H or $C_1$–$C_{20}$ hydrocarbyl; and X is a halide.

The inorganic compound is prepared by any suitable method. In one convenient method, the inorganic compound is made by reacting a tridentate ligand with one equivalent of an iron complex such as iron dichloride in an inert organic solvent. Preferred solvents include diethyl ether, tetrahydrofuran, hexane, and toluene. The reactions typically occur at room temperature, but temperatures of −20° C. to 150° C. can also be used. The product can be used in polymerization without isolation from the solvent. However, the solvent can also be evaporated and the inorganic compound can be collected.

The inorganic compound is combined with an activator to give a catalyst of the invention. Suitable activators are well known in the art. They include alumoxanes. Preferred alumoxanes (methyl alumoxane (MAO), PMAO, ethyl alumoxane, and diisobutyl alumoxane), aluminum alkyls (e.g., triethyl aluminum, triisobutylaluminum), alkyl aluminum halides (e.g., diethylaluminum chloride), and the like. Suitable activators include acid salts that contain non-nucleophilic anions. These acid salts generally consist of bulky ligands attached to boron or aluminum. Examples include lithium tetrakis(pentafluorophenyl)borate, lithium tetrakis(pentafluorophenyl)aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

The amount of activator needed relative to the amount of inorganic compound depends on many factors, including the nature of the inorganic compound and the activator, the desired reaction rate, the kind of polyolefin product, the reaction conditions, and other factors. Generally, however, when the activator is an alumoxane, an aluminum alkyl, or a dialkylaluminum halide, the molar ratio of activator to inorganic compound will be within the range of about 0.01:1 to about 5,000:1, and more preferably from about 0.1:1 to 500:1. When the activator is an organo borane or an ionic borate or aluminate, the molar ratio of the boron of the activator component to the inorganic compound will be within the range of about 0.01:1 to about 100:1, and more preferably from about 0.3:1 to 10:1.

If desired, a catalyst support can be used. However, the use of a support is generally not necessary for practicing olefin polymerization using the catalyst of the invention. The inorganic compound and the activator may be immobilized on a support, which is preferably a porous material. A support may be required for some processes. For example, a support is generally needed in gas phase and slurry polymerization processes to control polymer particle size and to prevent fouling of the reactor walls. The catalysts may be supported using any of a variety of well-known immobilization techniques. In one method, the inorganic compound is dissolved in a solvent and is deposited onto the support by evaporating the solvent. An incipient wetness method can also be used. The activator can also be deposited on the support or it can be introduced into the reactor separately from the supported inorganic compound.

The support can be inorganic oxides, inorganic chlorides, and polymeric resins such as polystryrene, styrene-divinylbenzene copolymers, or the like, or mixtures thereof. Preferred supports are inorganic oxides, which include oxides of Group 2, 3, 4, 5, 13, or 14 elements. More preferred supports include silica, alumina, silica-alumina, magnesia, titania, and zirconia.

The support can be used without any pre-treatment prior to immobilization of the inorganic compound and activator, but a support pre-treatment step is preferred. The support may be calcined and/or modified by a chemical additive. If the support is pre-treated by calcination, the calcination temperature is preferably greater than 150° C. The chemical additives used to pre-treat the support include organoaluminums, organoboranes, organomagnesiums, organosilanes, and organozinc compounds. Preferred chemical additives include alumoxanes, hexamethyldisilazane, trimethylchlorosilane, Grignard reagents, and triethylboron. Support modification techniques are taught in U.S. Pat. No. 6,211,311, the teachings of which are incorporated herein by reference.

The catalyst is particularly valuable for polymerizing olefins, preferably α-olefins. Suitable olefins include, for example, ethylene, propylene, 1-butene, 1-hexene, 1-octene, and the like, and mixtures thereof. The catalyst is valuable for copolymerizing ethylene with α-olefins or di-olefins (e.g., 1,3-butadiene, 1,4-hexadiene, 1,5-hexadiene).

Processes of the invention include gas phase, slurry, and bulk monomer processes. Gas and slurry phase processes are preferred. They can be used in a liquid phase (slurry, solution, suspension, bulk), high-pressure fluid phase, or gas phase polymerization processes, or a combination of these. The pressure in the polymerization reaction zones typically ranges from about 15 psia to about 15,000 psia, and the temperature usually ranges from about −100° C. to about 300° C.

A slurry process involves pressures in the range of about 1 to about 500 atmospheres and temperatures in the range of about −60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

The following examples merely illustrate the invention. Those skilled in the art will recognize many variations that are within the spirit of the invention and scope of the claims.

EXAMPLE 1

Preparation of Tridentate Ligands

This example describes the synthesis of a variety of tridentate ligands according to the general procedure of Hinman, *Organometallics,* 2000, 19, at 568. Ligands 1A-1D have the structural formula:

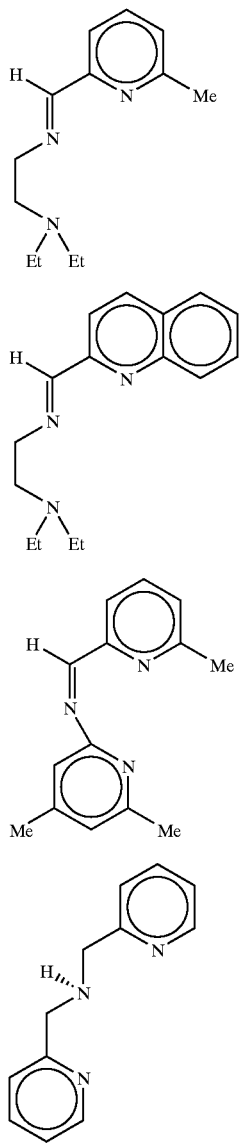

Ligand 1A is prepared by mixing 6-methyl-2-pyridinecarboxaldehyde (0.56 g, 4.6 mmol) and N,N-diethylethylenediamine (0.65 mL, 4.6 mmol) in diethyl ether (75 mL). The mixture is stirred for 24 hours at room temperature with excess magnesium sulfate. The magnesium sulfate is then filtered off and the solvent is removed by vacuum to give ligand 1A as an oil.

Ligand 1B is prepared according the above procedure except that 2-quinolinecarboxaldehyde (0.72 g, 4.6 mmol) is used in place of 6-methyl-2-pyridinecarboxaldehyde.

Ligand 1C is prepared according the above procedure except that 4,6-dimethyl-2-aminopyridine (0.56 g, 4.6 mmol) is used in place of N,N-diethylethylenediamine.

Ligand 1D (Di-(2-picolyl)amine) is a product of Aldrich Chemicals.

EXAMPLE 2

Preparation of Inorganic Compounds

This example describes the synthesis of a variety of inorganic compounds. Compounds 2A, 2D, and 2F and Comparative Compounds 2B, 2C, and 2E have the following structural formula:

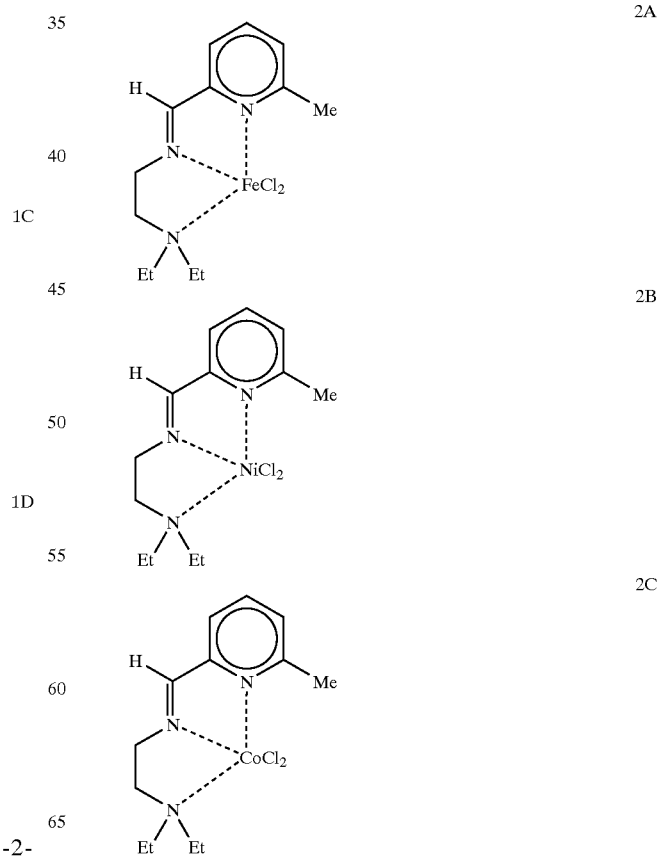

-continued

2D
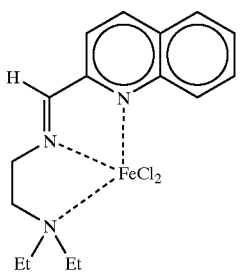

2E
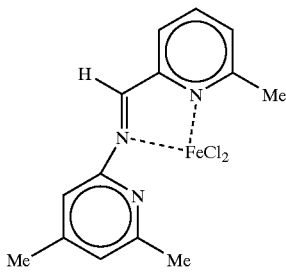

2F
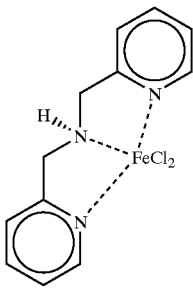

Toluene solutions of inorganic compounds 2A-2F are prepared by reacting 0.4 mmol of the corresponding ligand with 0.4 mmol of FeCl$_2$, CoCl$_2$, or NiCl$_2$ in toluene for 16 hours. Compound 2A is prepared from FeCl$_2$ and ligand 1A. Compound 2B is prepared from NiCl$_2$ and ligand 1A. Compound 2C is prepared from CoCl$_2$ and ligand 1A. Compound 2D is prepared from FeCl$_2$ and ligand 1B. Compound 2E is prepared from FeCl$_2$ and ligand 1C. Compound 2F is prepared from FeCl$_2$ and ligand 1 D.

Aliquots of the reaction mixtures are used in polymerization experiments.

EXAMPLE 3

Polymerization Runs

Polymerization is conducted in a stirred 2-liter, stainless-steel reactor. Reactions are run at 70° C. and 350 psi. Hydrogen (20 psi from a 300-mL vessel) is added to the reactor. Dry, oxygen-free isobutane (900 mL) is charged to the dry, oxygen-free reactor at room temperature along with 7.5 mL of 4.2 M PMAO in toluene solution (from Akzo Chemicals). The reactor is heated to 70° C. and allowed to equilibrate. Ethylene is then introduced to give a total pressure of 350 psig, and the reactor is allowed to equilibrate again. The inorganic compound (0.055 mmol of compound in 0.75 mL of toluene and 100 mL of isobutane) is injected into the reactor. Ethylene is fed to the reactor to maintain a constant pressure of 350 psi. At the end of 0.5 hour, ethylene flow is stopped, the reaction mixture is cooled to room temperature, and the polymer is recovered after venting the reactor. The polymer is collected and weighed.

Six runs (Runs 3A to 3F) are conducted using inorganic compounds 2A-2F. Table 1 shows the results of polymerization. The examples show that inorganic iron compounds of the invention are active in olefin polymerization, while comparable nickel and cobalt compounds show no activity. Also, comparative example 2E demonstrates that an iron compound that does not contain a N-(2-ethylamino)-2pyridylmethanimino or N,N-bis(2-pyridylmethyl)amino ligand is inactive in ethylene polymerization.

TABLE 1

| Polymerization Results | | | |
|---|---|---|---|
| Run # | Inorganic Compound # | Yield (g) | Activity (g PE/g metal/h) |
| 3A | 2A | 13.5 | 32,143 |
| 3B* | 2B* | 0 | — |
| 3C* | 2C* | 0 | — |
| 3D | 2D | 1.5 | 3571 |
| 3E* | 2E* | 0 | — |
| 3F | 2F | 0.9 | 2143 |

*Comparative Example

We claim:
1. A catalyst which comprises:
   (a) an activator; and
   (b) an inorganic compound comprising iron and a tridentate ligand selected from the group consisting of substituted or unsubstituted N-(2-ethylamino)-2-pyridylmethanimino ligands and substituted or unsubstituted N,N-bis(2pyridylmethyl)amino ligands.
2. The catalyst of claim 1 wherein the activator is selected from the group consisting of alumoxanes, neutral aluminum compounds, neutral boron compounds, ionic borates, and ionic aluminates.
3. A supported catalyst of claim 1.
4. A catalyst which comprises:
   (a) an activator; and
   (b) an inorganic compound comprising iron and a tridentate ligand selected from the group consisting of:

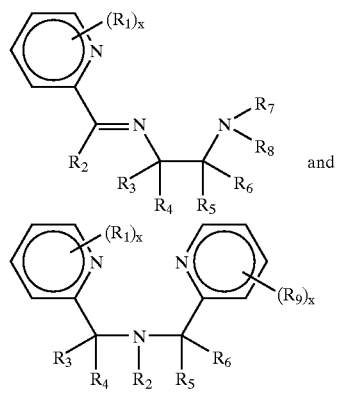

where

R$_1$ and R$_9$ are the same or different and are selected from the group consisting of H, F, Cl, Br, I, C$_1$–C$_{20}$ hydrocarbyl, and a condensed ring;
R$_2$, R$_3$, R$_4$, R$_5$, R$_6$, R$_7$, and R$_8$ are the same or different and are selected from the group consisting of H and C$_1$–C$_{20}$ hydrocarbyl; and
x=0–5.
5. The catalyst of claim 4 wherein the activator is selected from the group consisting of alumoxanes, neutral aluminum compounds, neutral boron compounds, ionic borates, and ionic aluminates.

6. A supported catalyst of claim 4.

7. A catalyst which comprises:
   (a) an activator; and
   (b) an inorganic compound of the formula:

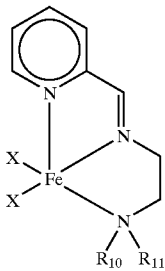

where
   $R_{10}$ and $R_{11}$ are the same or different and are selected from the group consisting of H and $C_1$–$C_{20}$ hydrocarbyl; and
   X is a halide.

8. The catalyst of claim 7 wherein the activator is selected from the group consisting of alumoxanes, neutral aluminum compounds, neutral boron compounds, ionic borates, and ionic aluminates.

9. The catalyst of claim 7 wherein X is chloride and $R_{10}$ and $R_{11}$ are the same or different and are selected from the group consisting of methyl, ethyl, propyl, and butyl.

10. A supported catalyst of claim 7.

11. A method which comprises polymerizing an olefin in the presence of the catalyst of claim 1.

12. The method of claim 11 wherein the olefin is ethylene or a mixture of ethylene and a $C_3$–$C_{10}$ α-olefin.

13. A method which comprises polymerizing an olefin in the presence of the catalyst of claim 4.

14. The method of claim 13 wherein the olefin is ethylene or a mixture of ethylene and a $C_3$–$C_{10}$ α-olefin.

15. A method which comprises polymerizing an olefin in the presence of the catalyst of claim 7.

16. The method of claim 15 wherein the olefin is ethylene or a mixture of ethylene and a $C_3$–$C_{10}$ α-olefin.

* * * * *